United States Patent Office 3,477,286
Patented Nov. 11, 1969

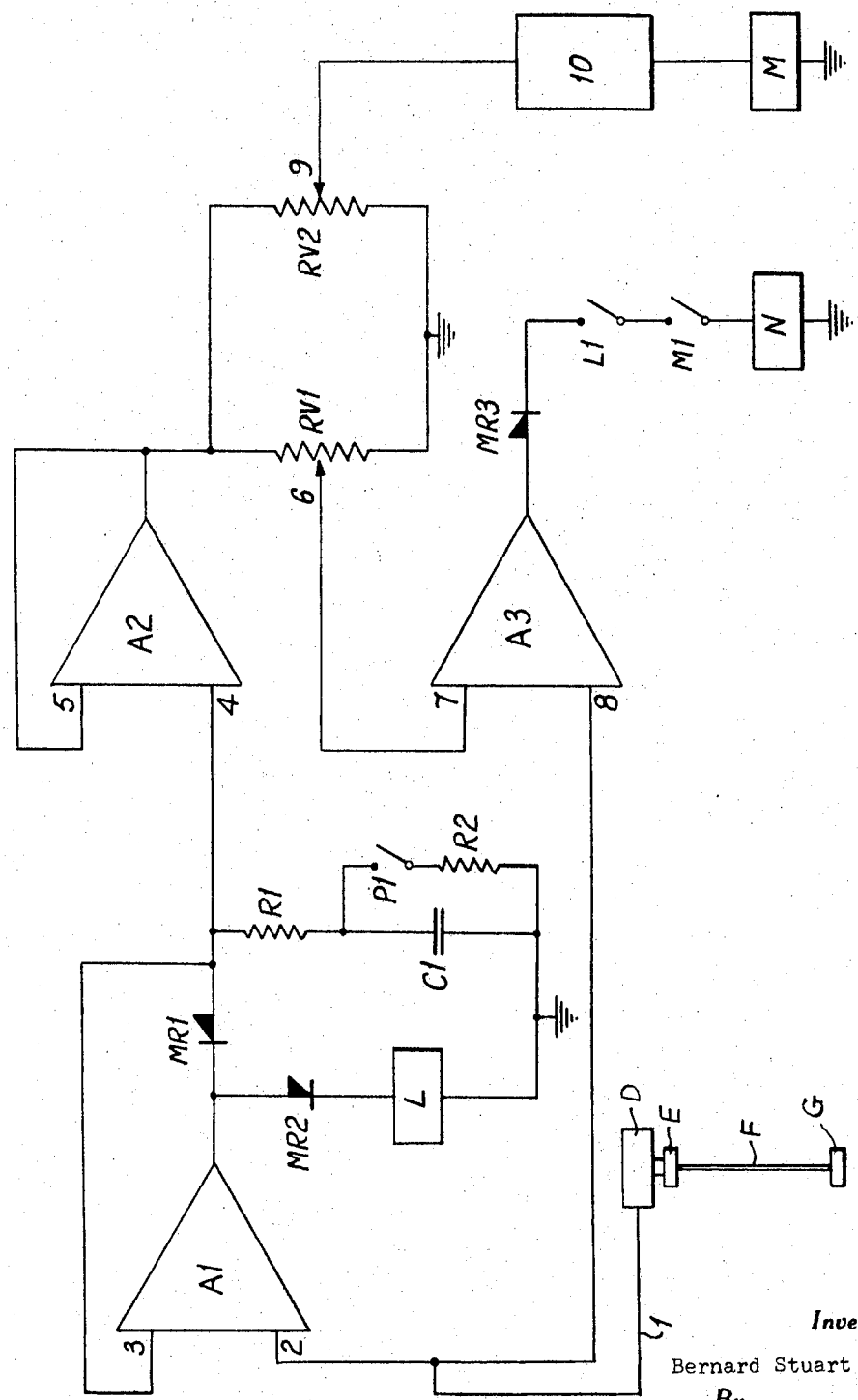

3,477,286
PEAK LOAD DETECTORS
Bernard Stuart Baker, Coventry, England, assignor to Courtaulds Limited, London, England, a British company
Filed Sept. 7, 1967, Ser. No. 666,208
Claims priority, application Great Britain, Sept. 30, 1966, 43,778/66
Int. Cl. G01n 3/08
U.S. Cl. 73—95                                  7 Claims

ABSTRACT OF THE DISCLOSURE

A method of detecting a peak load applies to an article under test (e.g. in a tensile testing apparatus) which comprises continuously generating a signal having a voltage proportional to the load applied to the article, storing a charge which is equal, at any time, to the maximum voltage of the signal reached up to that time during the test, and continuously comparing a predetermined proportion of the voltage of the stored charge with the voltage of the signal to give an indication when the former exceeds the latter. An electrical circuit for carrying out the method is also claimed.

---

In the testing of articles, particularly elongated articles such as yarns, filaments and wires, it is commonly desired to have some indication of when a maximum strain or load on the article has been reached. This is of particular concern, for example, in automatic or semi-automatic tensile testing apparatus where it is required that a signal indicating the extension of the article shall be discontinued immediately when the load on the article falls below its maximum value. A further common requirement is an indication when the load on the article has fallen by some amount below its maximum value such that no further useful information on the properties of the article under test can be obtained, and thus that the end of the test has been reached.

With some articles the maximum load corresponds with breakage of the article in which case a break detector of the rate/amplitude type may be employed to indicate both that the maximum load has been reached and that the test may be concluded due to complete breakage of the article under test. This type of detector operates on a signal generated on a rapid decrease in the load on the article under test.

The use of a rate/amplitude type of break detector to terminate a test at the point of maximum load is generally satisfactory for materials which have a 'snap' breakage during testing. However, with materials where the load on the article increases, on extension of the article, to a maximum value and then decreases to some extent before breakage of the article, this type of break detector is unsatisfactory. Where extension results are determined by terminating tests at points beyond the point of maximum load where the break detector operates, the extension results tend to be widely spread and on the high side. It is then preferable to use a break detector which determines the point of maximum load.

During the testing of some articles, particularly textile yarns, the load on the articles fluctuates with increasing extension. A graph of load against extension for such articles shows a series of minor peaks in the load, each of which peaks is believed to correspond to the breakage of individual elements in the articles, for example filaments or fibres in yarns, which terminate in a maximum peak in the load which thereafter decreases to zero when the article as a whole breaks. For such articles it may be desirable to continue testing beyond the point at which the first minor peak, or temporary relaxation, in the load is observed although measuring the extension in the article only up to the point of the first observed minor peak load. Then, if the load subsequently increases to a greater value than that of the earlier minor peak, the extension measurement is recommenced until the next peak is reached. This may be continued until the maximum peak in the load on the article has been reached which corresponds with breakage of the article. Alternatively it may be desired to terminate testing, or to indicate in some manner, when a first or subsequent minor peak in the load is reached for determining when individual elements of an article break.

The present invention provides a method and an apparatus for detecting a peak load on an article during its testing. The peak detected may be the maximum load on the article prior to breakage or a minor peak in the load caused by the breakage of one or more individual elements in the article.

According to one aspect of this invention a method of detecting a peak load applied to an article during its testing comprises continuously generating a signal having a voltage proportional to the load on the article, continuously storing a charge derived from the signal, the voltage of the charge being equal, at any time, to the maximum voltage of the signal reached up to that time during the test, and continuously comparing a predetermined proportion of the voltage of the stored charge with the voltage of the signal to give an indication when the former exceeds the latter.

According to a further aspect of the invention, apparatus for detecting a peak load applied to an article during its testing comprises loading means for applying loads to the article, a device responsive to the load for producing a signal having a voltage proportional thereto, a capacitor for storing a charge derived from the signal, means for maintaining the voltage of the charge at a value equal, at any time, to the maximum voltage of the signal reached up to that time during the test, means for deriving a second voltage equal to a predetermined proportion of the voltage of the stored charge, and a comparator for continuously comparing the second voltage with the voltage of the signal and for giving an indication when the former exceeds the latter.

The signal corresponding to the load on the article may have either a negative or a positive voltage and the voltage of the stored charge will, of course, have the same polarity as that of the signal. For the purpose of comparing the predetermined proportion of the voltage of the stored charge with the voltage of the signal, the polarity of the voltages is ignored so that the former may be considered to exceed the latter when the former has a greater positive or negative potential than the latter, as the case may be.

The predetermined proportion of the voltage of the stored charge, which is compared with the voltage of the signal, is chosen according to whether it is the maximum peak in the load which is to be determined or a lesser peak in the load. Thus, if the predetermined proportion is, say, 99 percent, the second signal will be generated to indicate that the desired peak in the load has been reached when the voltage of the signal corresponding to the load on the article has dropped by only 1 percent. This is a minor peak which might correspond, for example, with the breaking of only one filament in a yarn comprising several filaments. Alternatively, if the predetermined proportion of the voltage of the stored charge is chosen to be, say 50 percent, the peak in the load determined would normally be that occurring immediately before complete breakage of the article under test.

In order to prevent premature indication that the desired peak in the load has been reached when the actual load on the article is very small, and any peaks in the load are caused by extraneous 'noise,' for example by vibration, it is preferable to use a low limit detector which prevents such indication until the load on the article has risen to a predetermined 'safe' level.

This invention is particularly applicable to the tensile testing of a yarn, or like elongated element, on apparatus in which the yarn is clamped between two clamps, one of which is fixed to the arm of a load cell and the other of which is movable to tension and elongate the yarn. On movement of the movable clamp, the load on the yarn increases and is measured by the load cell which produces a potential which is a function of the load applied to it. It is thus possible to determine the load on the yarn at any time during a test and also the load necessary to break the yarn. Proprietary load cells of various types are available.

An embodiment of the invention is illustrated, by way of example, with reference to the accompanying drawing which is a circuit diagram of parts of an apparatus for determining the tensile properties of yarns.

In the drawing a signal input line 1 carries a signal having a voltage proportional to the load on a yarn under test. The signal is generated by a load cell D connected to one clamp E of a pair of clamps between which the yarn F under test is clamped, the other clamp G being movable to tension and elongate the yarn. During the test the extension of the yarn is determined from the position of the movable clamp G whilst the load on the yarn F is determined by the voltage of the signal from the load cell D.

The line 1 is connected to an input terminal 2 of a high grade operational amplifier A1 which is capable of being operated as a high-gain differential amplifier or as a unity-gain buffer amplifier. The amplifier A1 should have a very high input impedance (e.g. an input resistance which is preferably not less than $10^{12}$ ohms). The output of the amplifier A1 is connected via a diode MR1 to its other input terminal 3 so that the amplifier operates, with a negative signal on the line 1, as a unidirectional, unity-gain, buffer amplifier.

The output of the amplifier A1 is also connected through the diode MR1 and a resistor R1 (an optional, circuit-stabilising resistor) to one side of a low-leakage, high-grade capacitor C1, the other side of which is earthed, so that the capacitor is charged to the maximum potential of the signal on line 1. The capacitor will remain charged to the maximum potential of the signal after any decay in the voltage of the signal because of the isolating effect on the diode MR1. The charge on the capacitor C1 also causes the input 3 of the amplifier A1 to be maintained at the potential of the charge.

The output of the amplifier A1 is also connected through a second diode MR2 to one terminal of a relay L the other terminal of which is earthed. When the voltage of the signal on the line 1 fed to the input 2 of the amplifier A1 falls below the voltage at the input 3, that is when any peak in the load is reached, the amplifier operates as a high-gain differential amplifier. The output signal from the amplifier is then positive so that the relay is energised through the diode MR2. Energisation of the relay L causes a contact switch (not shown) to open which interrupts the signal indicating the degree of extension of the yarn F, the signal being derived from a potentiometer (not shown) connected to the movable clamp G. The extension of the yarn F continues but a charge, having a voltage corresponding to the extension at the point when the load reached a peak, is retained on an extension storage capacitor (not shown). It will be appreciated that other methods of measuring the extension and of interrupting the measurement could, of course, be used.

After the first peak in the load has been reached, if the characteristics of the yarn under test are such that the load subsequently increases to a new peak so that the load signal once again gives a higher voltage at the input 2 than that maintained at the input 3 by the capacitor C1, the amplifier A1 reverts to its unidirectional, unity-gain, buffer amplifier mode of operation. Its output signal then becomes negative, the relay L is de-energised and the capacitor C1 becomes charged to the new maximum voltage of the input signal on the line 1.

The de-energisation of the relay L causes re-connection, through a contact switch in the relay, of the extension signal to the extension storage capacitor. The extension storage capacitor is thus charged to the higher voltage corresponding to the new extension of the yarn when the load signal reaches its new peak.

However, after the load signal has reached its new peak, the amplifier A1 reverts to its high-gain differential amplifier mode of operation. The capacitor C1 is then charged to the voltage corresponding to the new peak load and the relay L is energised so isolating the extension storage capacitor, as described above. This sequence may be repeated as each peak in the load is reached until the end of the test which is determined by a further part of the circuit shown in the drawing.

The capacitor C1 is connected through the resistor R1 to an input 4 of a second high-grade operational amplifier A2 also having a very high input impedance. This amplifier is connected with a feed-back from its output to its other input 5 so that it operates at a unity-gain buffer amplifier. The output on the amplifier A2 is thus at the same voltage as that of the charge on the capacitor C1.

The output of the amplifier A2 is also connected to two voltage dividers RV1 and RV2. A wiper 6 of the voltage divider RV1 is connected to an input 7 of a conventional differential amplifier A3, the other input 8 of which is connected to the line 1 for application of the load signal to that input of the amplifier. The voltage divider RV1 is adjustable so that any proportion between 10 and 100 percent of the voltage at the output of the amplifier A2 can be applied to the input 7 of the amplifier A3. Thus, as in this embodiment of the invention the load signal has a negative potential, at any peak in the load signal, the voltage at the input 8 of the amplifier A3 will have a greater negative value than the voltage at the input 7. The output of the amplifier A3 will then be negative. After a peak in the load signal has been reached the reduction in the voltage at the input 8, whilst the voltage at the input 7 remains constant, will cause a point to be reached, depending on the setting of the voltage divider RV1, at which the voltage at the input 8 becomes less negative than that at the input 7. At this point the output from the amplifier A3 becomes positive. Thus, if the voltage divider RV1 is set to apply to input 7, say, 99 percent of the voltage at the output of the amplifier A2, a small peak in the load signal would be sufficient to cause the amplifier A3 to produce a positive output signal. Such a small peak would correspond with the breakage of individual filaments or fibres in the yarn under test. Alternatively, if the voltage divider RV1 was set at, say, 50 percent of the voltage, at the output of the amplifier A2, the amplifier A3 would produce the positive output signal only when the load signal had dropped so far after a peak that the end of the test would have been reached on complete breakage of the yarn.

The output of the amplifier A3 is connected through a further diode MR3 and contact switches L1 and M1 to one terminal of a second relay N the other terminal of which is earthed. The diode MR3 is arranged to be conductive when the output from the amplifier A3 is positive so that the relay N is energised only when the output from the amplifier is positive and when the contact switches L1 and M1 are closed. The contact switch L1 is closed by energisation of the relay L as described above and the contact switch M1 forms part of the circuit described below for preventing premature ending of the test.

The point, during the decay of the load signal following a peak, at which the relay N is energised may thus be determined precisely as the point at which the load signal falls to a prechosen fraction of the preceding peak in the load signal, by suitable setting of the voltage divider RV1. Contacts in the relay N are used to indicate the end of the test if the voltage divider RV1 is set at such a level that no further load peaks would be expected to occur. The setting of the voltage divider RV1 is controlled by the operator of the tensile testing apparatus according to the characteristics of the particular yarn under test.

To prevent premature ending of the test by energisation of the relay N through undue 'noise' in the input signal, particularly when the voltage of the signal is low, the voltage divider RV2 has its wiper 9 connected to a standard type of low limit detector circuit, shown as a 'box,' 10. The output of the low limit detector circuit 10 is connected to one terminal of a relay M the other terminal of which is earthed. Thus, the relay M is energised only when the input signal on the line 1 has risen to a predetermined 'safe' level, which is determined by position of the wiper 9 along the voltage divider RV2 and the setting of the low limit detector circuit 10. As energisation of the relay M causes the contact switch M1 to close, premature energisation of the relay N by a signal from the amplifier A3 is thus prevented.

When the end of a test is reached, as indicated by energisation of the relay N, the elongation of the yarn under test is stopped and the results of the test, as indicated by the peak load voltage reached and the voltage of the charge on the extension storage capacitor, are determined by purely conventional means not shown. To reset the circuit for the commencement of another test there is provision for discharging the capacitor C1 to earth. This takes the form of a contact switch P1 and a resistor R2 connected in parallel with the capacitor C1. The value of the resistor R2 is chosen so as to limit the discharge current to the ratings specified for the components concerned. The contact switch P1 is energised by a hand-operated relay (not shown). Many other simple methods of resetting the circuit could be obviously used.

It will be appreciated that in order to prevent any appreciable discharge from the capacitor C1 during each test the circuit leakage must be very small.

What is claimed is:

1. A method of detecting a peak load applied to an article during its testing comprising continuously generating a signal having a voltage proportional to the load on the article, continuously storing a charge derived from the signal, the voltage of the charge being equal, at any time, to the maximum voltage of the signal reached up to that time during the test, and continuously comparing a predetermined proportion of the voltage of the stored charge with the voltage of the signal to give an indication when the former exceeds the latter.

2. A method as claimed in claim 1, in which the indication that the predetermined proportion of the voltage of the stored charge exceeds the voltage of the signal is prevented until the load on the article has risen to a predetermined level.

3. Apparatus for detecting a peak load applied to an article during its testing comprising loading means for applying loads to the article, a device responsive to the load for producing a signal having a voltage proportional thereto, a capacitor for storing a charge derived from the signal, means for maintaining the voltage of the charge at a value equal, at any time, to the maximum voltage of the signal reached up to that time during the test, means for deriving a second voltage equal to a predetermined proportion of the voltage of the stored charge, and a comparator for continuously comparing the second voltage with the voltage of the signal and for giving an indication when the former exceeds the latter.

4. Apparatus as claimed in claim 3, in which the means for deriving the second voltage is an adjustable voltage divider across which a voltage equal to the voltage of the stored charge is applied.

5. Apparatus as claimed in claim 3, in which the indication given by the comparator is generated in a relay connected to the output of the comparator, the relay being in series with a switch closed only when the voltage signal produced by the load-responsive device has risen to a predetermined level.

6. Apparatus as claimed in claim 5, in which the relay is also in series with a second switch closed only when the magnitude of the voltage from the load-responsive device is less than the voltage of the stored charge.

7. Apparatus as claimed in claim 3, in which a switch-controlled shorting circuit is in parallel with the capacitor to discharge the capacitor at the termination of a test.

References Cited

UNITED STATES PATENTS

| | | | |
|---|---|---|---|
| 3,386,081 | 5/1968 | Varsos | 340—172 |
| 3,379,054 | 4/1968 | Folweiler | 73—95 |
| 3,197,697 | 7/1965 | McCauley | 324—62 |
| 3,140,601 | 7/1964 | Weyland | 73—89 |
| 3,212,324 | 10/1965 | Martin | 73—88.5 |
| 3,146,618 | 9/1964 | MacGeorge | 73—88.5 |
| 2,882,522 | 4/1959 | Pearlman | 340—253 |

RICHARD C. QUEISSER, Primary Examiner

JOHN J. WHALEN, Assistant Examiner

U.S. Cl. X.R.

73—88.5